(12) United States Patent
Shin et al.

(10) Patent No.: US 12,112,670 B2
(45) Date of Patent: Oct. 8, 2024

(54) ELECTRONIC DEVICE COMPRISING FLEXIBLE DISPLAY, AND METHOD FOR CONTROLLING SAME

(71) Applicant: Samsung Electronics Co., Ltd., Suwon-si (KR)

(72) Inventors: Hyunho Shin, Suwon-si (KR); Yongyoun Kim, Suwon-si (KR); Jungchul An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/361,077

(22) Filed: Jul. 28, 2023

(65) Prior Publication Data
US 2023/0368713 A1    Nov. 16, 2023

Related U.S. Application Data

(63) Continuation of application No. PCT/KR2022/001449, filed on Jan. 27, 2022.

(30) Foreign Application Priority Data

Jan. 29, 2021   (KR) .......................... 10-2021-0013165

(51) Int. Cl.
G09G 3/00    (2006.01)
G06F 1/16    (2006.01)

(52) U.S. Cl.
CPC ........... *G09G 3/035* (2020.08); *G06F 1/1652* (2013.01); *G09G 2320/02* (2013.01); *G09G 2320/0666* (2013.01)

(58) Field of Classification Search
CPC ............... G09G 3/035; G09G 2320/02; G09G 2320/0666; G09G 2340/14;
(Continued)

(56) References Cited

U.S. PATENT DOCUMENTS

| 7,688,347 B2 | 3/2010 | Dolgoff |
| 2011/0037576 A1 | 2/2011 | Jeon et al. |

(Continued)

FOREIGN PATENT DOCUMENTS

| CN | 111554188 A | 8/2020 |
| CN | 111965906 A | 11/2020 |

(Continued)

OTHER PUBLICATIONS

Australian Examination Report dated Nov. 16, 2023 for AU Application No. 2022211949.
(Continued)

*Primary Examiner* — David Tung
(74) *Attorney, Agent, or Firm* — Nixon & Vanderhye P.C.

(57) ABSTRACT

An electronic device may include: a flexible display; and at least one processor. The at least one processor may be configured to: identify the folding angle of the electronic device; identify the displacement of a printed layer of the flexible display according to the identified folding angle; generate a virtual dead space region to substantially abut a portion of the boundary of the printed layer on the basis of the identified displacement; and output at least a portion of the generated virtual dead space region in a specified color on the flexible display.

15 Claims, 17 Drawing Sheets

(58) Field of Classification Search
CPC ............ G09G 2354/00; G09G 2380/02; G06F 1/1652; G06F 1/1616; G06F 1/1641; G06F 1/1677; G06F 1/1681; G06F 1/1684; G06F 3/0418; G06F 2203/04102; G06F 2203/04103
See application file for complete search history.

(56) References Cited

U.S. PATENT DOCUMENTS

| | | | |
|---|---|---|---|
| 2017/0170127 A1 | 6/2017 | Kim et al. | |
| 2017/0300736 A1 | 10/2017 | Song et al. | |
| 2019/0130822 A1 | 5/2019 | Jung et al. | |
| 2019/0246018 A1* | 8/2019 | Rho | G03B 9/08 |
| 2020/0169680 A1 | 5/2020 | Park et al. | |
| 2020/0329178 A1 | 10/2020 | Moon et al. | |
| 2021/0060855 A1 | 3/2021 | Bendjus et al. | |
| 2021/0297563 A1* | 9/2021 | Manea | H04N 23/57 |
| 2022/0116546 A1* | 4/2022 | Gummadi | H04M 1/724 |
| 2022/0137677 A1 | 5/2022 | Jung | |
| 2022/0368786 A1* | 11/2022 | Kim | G06F 1/1647 |

FOREIGN PATENT DOCUMENTS

| | | |
|---|---|---|
| CN | 113888961 A | 1/2022 |
| KR | 101469779 B1 | 12/2014 |
| KR | 101620465 B1 | 5/2016 |
| KR | 20170088712 A | 8/2017 |
| KR | 101796660 B1 | 11/2017 |
| KR | 20190121690 A | 10/2019 |
| KR | 20200060118 A | 5/2020 |
| KR | 20200101227 A | 8/2020 |
| KR | 20200119639 A | 10/2020 |
| KR | 10-2020-0128664 A | 11/2020 |
| WO | 2020262965 A1 | 12/2020 |

OTHER PUBLICATIONS

Russian Search Report dated Feb. 1, 2024 for RU Application No. 2023122226.
Russian Decision on Grant dated Feb. 1, 2024 for RU Application No. 2023122226.
International Search Report for PCT/KR2022/001449 mailed May 6, 2022, 5 pages.
Written Opinion of the ISA for PCT/KR2022/001449 mailed May 6, 2022, 4 pages.
European Search Report dated May 15, 2024 for EP Application No. 22746242.1.

* cited by examiner

ELECTRONIC DEVICE COMPRISING FLEXIBLE DISPLAY, AND METHOD FOR CONTROLLING SAME

CROSS REFERENCE TO RELATED APPLICATIONS

This application is a continuation of International Application No. PCT/KR2022/001449 filed on Jan. 27, 2022, designating the United States, in the Korean Intellectual Property Receiving Office, and claiming priority to Korean Patent Application No. 10-2021-0013165 filed on Jan. 29, 2021, the disclosures of which are all hereby incorporated by reference herein in their entireties.

BACKGROUND

Field

Various example embodiments relate to an electronic device, for example, an electronic device including at least a pair of housings rotatably coupled with each other and/or a method of controlling the same.

Description of Related Art

Along with the development of electronic, information, and communication technologies, various functions have been integrated into a single portable communication device or electronic device. For example, a smartphone includes the function of an audio player, an imaging device, or an electronic organizer as well as a communication function, and may be equipped with more various functions by installing additional applications.

Beyond functions (e.g., applications) or information available in portable communication devices or electronic devices, users may search for, select, and obtain more information by accessing a network. Although a direct access scheme (e.g., wired communication) for accessing a network may enable fast and stable communication establishment, a user area may be limited to a fixed location or a certain amount of space. A wireless communication scheme for accessing a network is less limited in location or space, and its transmission speed or stability gradually reach the same level as that of the direct access scheme. In the future, it is expected that the wireless communication scheme will provide a faster and more stable communication environment than the direct access scheme.

As the use of personal or portable communication devices such as smartphones becomes common, user demands for portability and convenience of use are increasing. For example, a touch screen display may be an output device that outputs a screen, for example, visual information and provide a virtual keypad that replaces a mechanical input device (e.g., a button-type input device) as well. As a result, portable communication devices or electronic devices may provide the same or improved usability (e.g., a larger screen), while being miniaturized. On the other hand, owing to commercialization of flexible, for example, foldable or rollable displays, the portability and convenience of use of electronic devices are expected to be further improved.

SUMMARY

In general, a display may include a light emitting layer, a protective layer (e.g., a window sheet or a front plate), and/or a plurality of layers disposed between the light emitting layer and the protective layer. The 'plurality of layers' may include, for example, a polarization plate, a touch sensing electrode layer, a printed layer, a decorative film, and/or at least one adhesive layer bonding adjacent layers to each other. A flexible display may also include a plurality of such layers, and a relative displacement may occur between different layers in a folded or rolled operation. For example, the position of the printed layer relative to the light emitting layer may be different in a folded or rolled state, compared to a flat state. When this relative displacement is recognized by a user's naked eyes, the user may feel uncomfortable about defects or damage of the electronic device or flexible display.

Various example embodiments may provide a flexible display that relives discomfort caused by a relative displacement within the flexible display, an electronic device including the flexible display, and/or a method of controlling the same.

Various example embodiments may provide a flexible display that implements various user experiences, using a relative displacement within the flexible display, an electronic device including the flexible display, and/or a method of controlling the same.

An electronic device according to an example embodiment may include a flexible display and at least one processor. The at least one processor may be configured to identify a folding angle of the electronic device, identify a displacement of a printed layer of the flexible display according to the identified folding angle, generate a virtual dead space area substantially contacting a part of a boundary of the printed layer of the flexible display, based on the identified displacement, and output at least a part of the generated virtual dead space area in a specified color on the flexible display.

An electronic device according to an example embodiment may include a flexible display and at least one processor. The at least one processor may be configured to identify a folding angle of the electronic device, identify a displacement of a printed layer of the flexible display according to the identified folding angle, generate a virtual dead space area based on the identified displacement, wherein a position to which a center of the printed layer is moved according to folding of the electronic device substantially coincides with a center of the virtual dead space area, and output at least a part of the generated virtual dead space area in a specified color on the flexible display.

A method of controlling an electronic device according to an example embodiment may include identifying a folding angle of the electronic device, identifying a displacement of a printed layer of the flexible display according to the identified folding angle, generating a virtual dead space area substantially contacting a part of a boundary of the printed layer of the flexible display, based on the identified displacement, and outputting at least a part of the generated virtual dead space area in a specified color on the flexible display.

According to various example embodiments, a screen corresponding to a relative displacement within a flexible display may be provided to thereby use the relative displacement visually recognizable in a screen display area (e.g., an active area) as a decorative effect. For example, discomfort that a user may feel may be relieved, while a new user experience is provided by utilizing the relative displacement within the flexible display.

Besides, various effects identified directly or indirectly may be provided through this document.

BRIEF DESCRIPTION OF DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
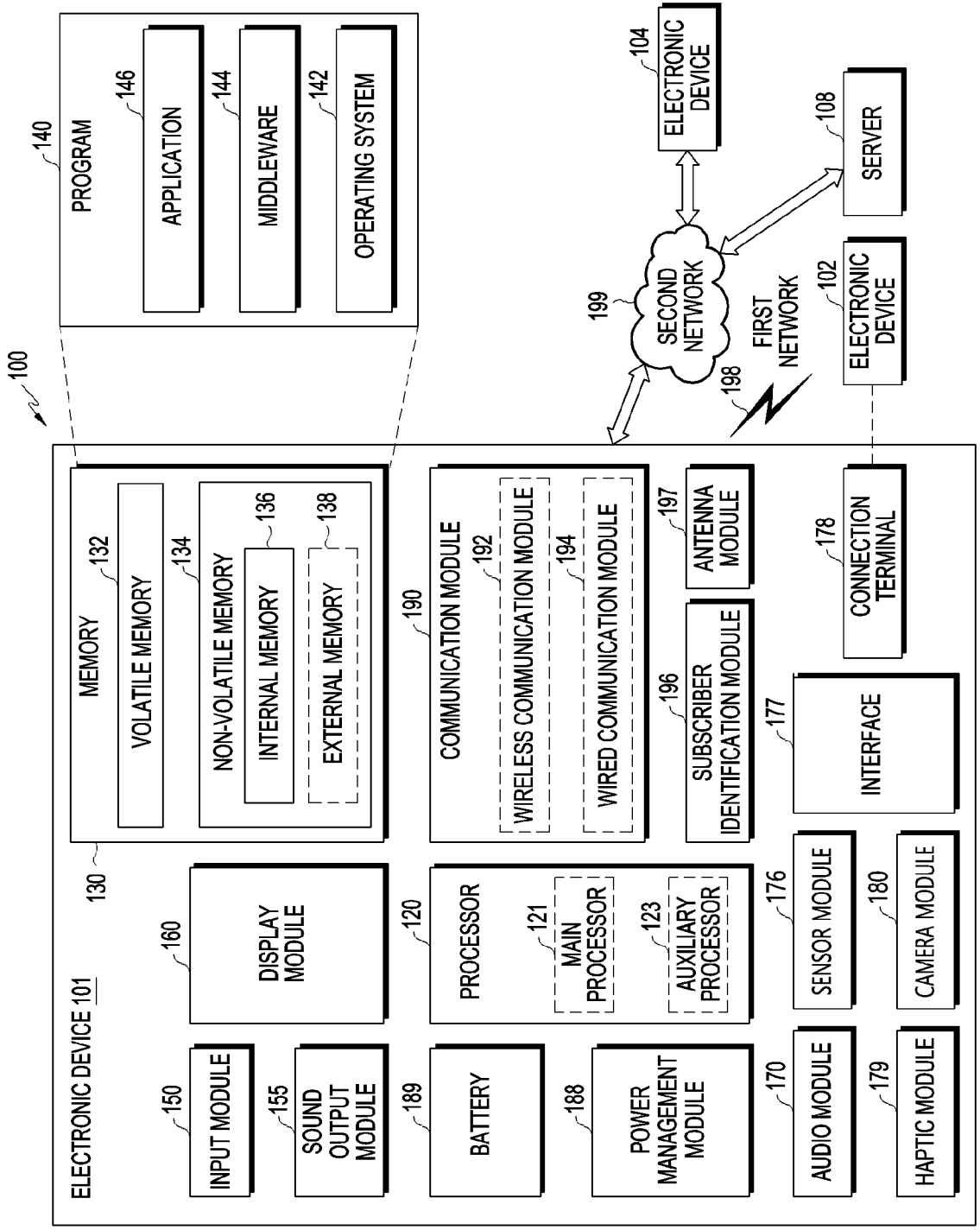
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting/connection terminal 178, a haptic module 179, a camera module 180, a power management module 188, a battery 189, a communication module 190, a subscriber identification module (SIM) 196, or an antenna module 197. In a certain embodiment, at least one of the components (e.g., the connecting terminal 178) may be omitted from the electronic device 101, or one or more other components may be added in the electronic device 101. In a certain embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134 (e.g., including internal memory 136 and/or external memory 138). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
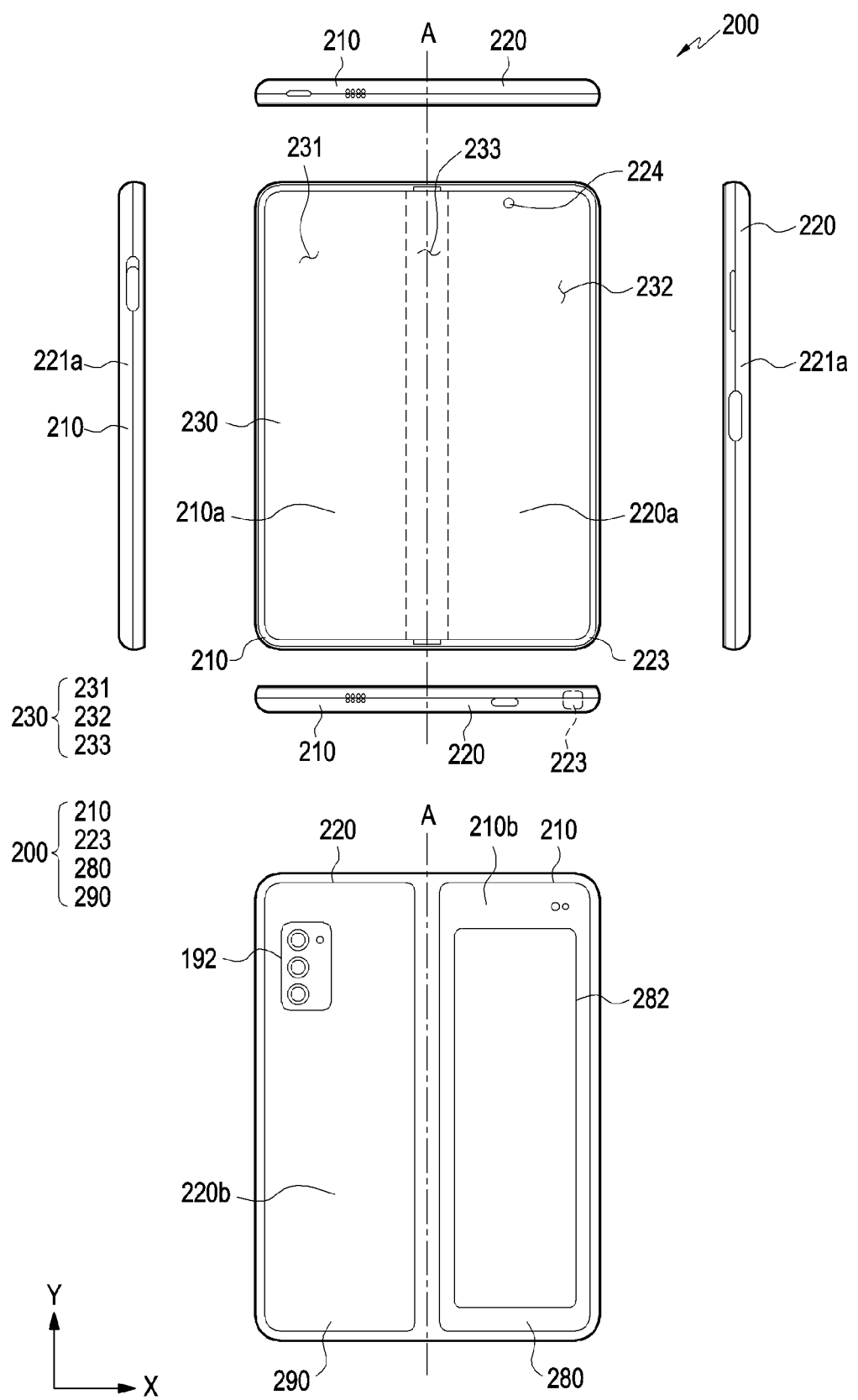
FIG. 2 is a diagram illustrating a flat state of an electronic device according to various example embodiments.
Figure 3:
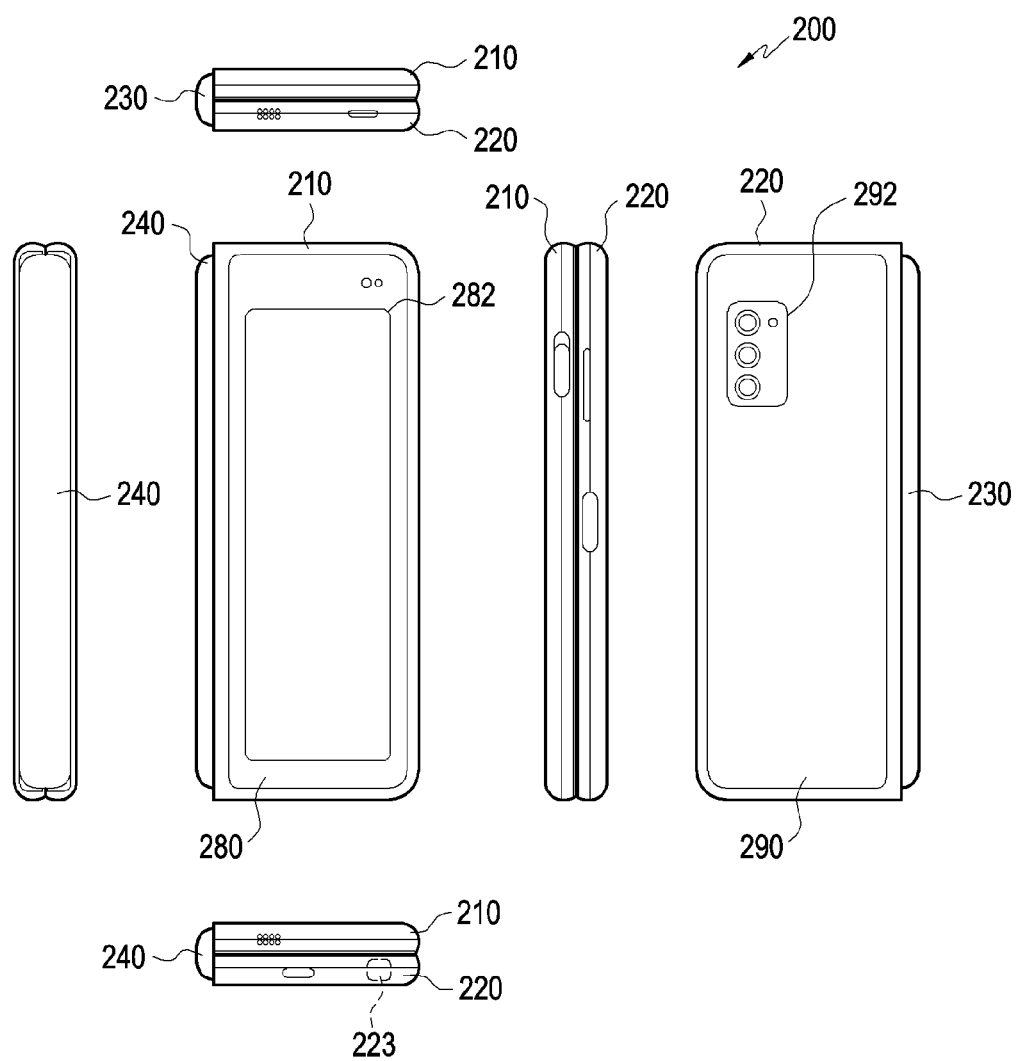
FIG. 3 is a diagram illustrating an electronic device in a folded state according to various example embodiments.
Figure 4:
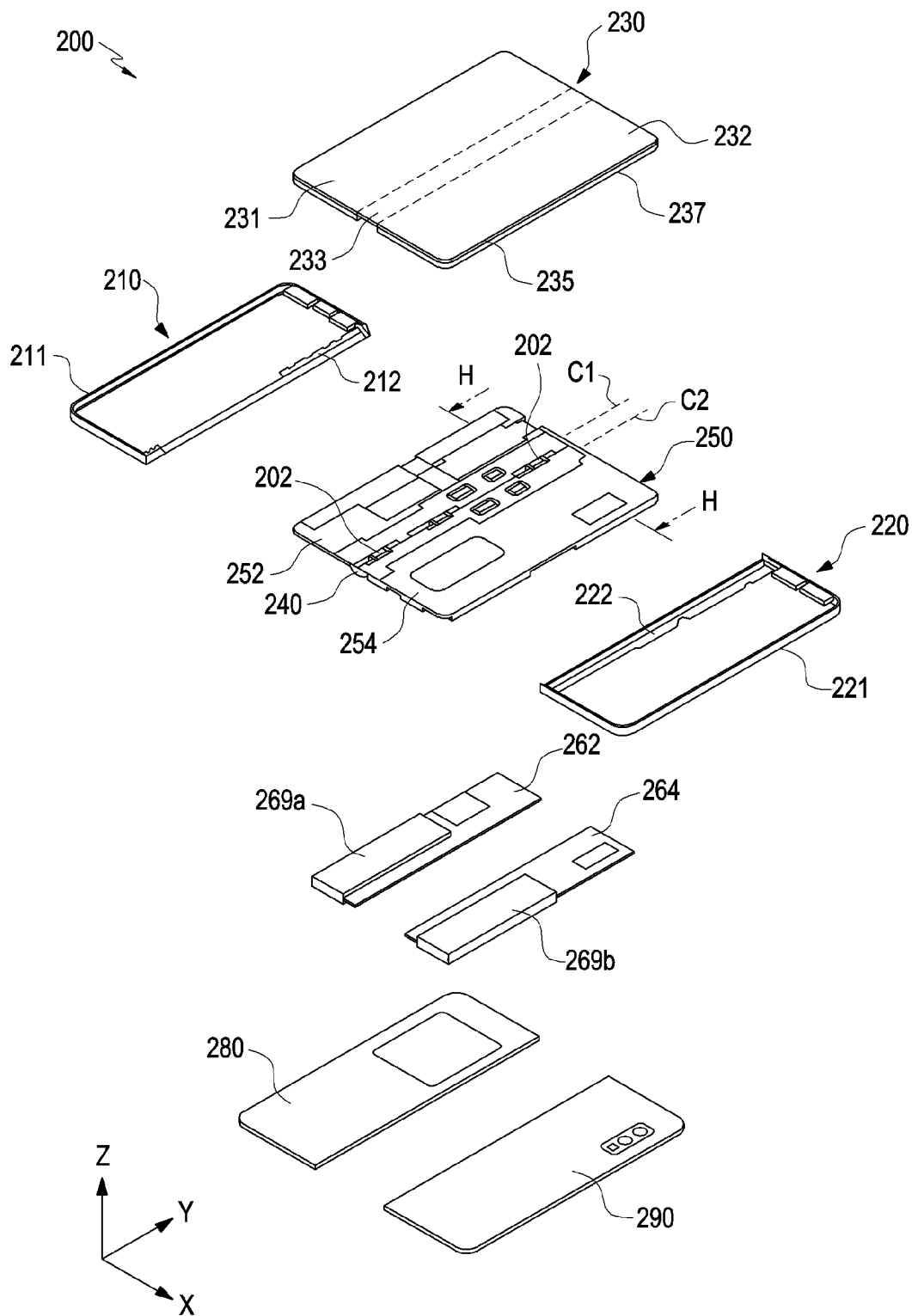
FIG. 4 is an exploded perspective view illustrating an electronic device according to various example embodiments.

FIG. 2 is a diagram illustrating an electronic device 200 in a flat state according to various example embodiments. FIG. 3 is a diagram illustrating the electronic device 200 in a folded state according to various example embodiments. FIG. 4 is an exploded perspective view illustrating the electronic device 200 according to various example embodiments.

In describing various example embodiments, a configuration in which a pair of housings (e.g., a first housing 210 and a second housing 220) are pivotably coupled, directly or indirectly, with each other by at least a hinge structure (e.g., a hinge module 202, comprising a hinge, of FIGS. 4 and/or 5) may be taken as an example. However, it is to be noted that this embodiment does not limit the electronic device 200 according to various example embodiments. For example, the electronic device 200 according to various example embodiments may include three or more housings, and "a pair of housings" in an embodiment disclosed below may indicate "two housings pivotably coupled with each other among three or more housings".

In the following detailed description, reference may be made to a "+X/−X direction", a "+Y/−Y direction" or a "+Z/−Z direction", and the Cartesian coordinate system to be described below is described based on a width direction X, a length direction Y, or a thickness direction Z of the first housing 210 on the whole in FIGS. 2 to 4. For example, the definitions of the directions may be variously changed according to embodiments or based on other structures of the electronic device 200 used as a reference. In addition, in the following detailed description, the 'front surface' or 'rear surface' of the electronic device 200 or the housings 210 and 220 may be referred to, and regardless of relative positions (e.g., a flat state or a folded state) of the housings 210 and 220, a surface on which a flexible display 230 of FIG. 2 is disposed is defined as 'the front surface of the electronic device 200 (or the housings 210 and 220)', and a surface facing in the opposite direction to the surface on which the flexible display 230 is disposed is defined as 'the rear surface of the electronic device 200 (or the housings 210 and 220)'. According to a certain embodiment, a "configuration in which the electronic device 200 includes a display", may be mentioned, and the "display" may indicate the flexible display 230 of FIGS. 2-4.

Referring to FIGS. 2 and 3, in an embodiment, the electronic device 200 may include a pair of housings 210 and 220 pivotably connected, directly or indirectly, to each other, a hinge cover (e.g., a hinge cover 240 of FIGS. 3-4) covering foldable parts of the housings 210 and 220, and the flexible or foldable display 230 disposed in a space formed by the housings 210 and 220. According to an embodiment, a surface on which the foldable/flexible display 230 is disposed may be defined as a first surface 210a and/or a third surface 220a of the electronic device 200 and/or the housings 210 and 220. In another embodiment, a surface opposite to the first surface 210a and/or the third surface 220a is a second surface 210b and/or a fourth surface 220b of the electronic device 200 and/or the housings 210, 220. In another embodiment, a surface surrounding a space between the first surface 210a and the second surface 210b and/or a space between the third surface 220a and the fourth surface 220b may be defined as a side surface (e.g., a first side surface 211a and a second side surface 221a) of the electronic device 200 and/or the housings 210 and 220.

According to various embodiments, the housings 210 and 220 may include the first housing (or first housing structure) 210, the second housing (or second housing structure) 220 including a sensor area 224, a first rear cover 280, a second rear cover 290, and the hinge structure or hinge module 202 comprising a hinge. According to a certain embodiment, the sensor area 224 may be provided on the first housing 210 (see FIG. 8), or additional sensor areas which are not shown may be provided on the first housing 210 and the second housing, respectively. The housings 210 and 220 of the electronic device 200 are not limited to the shapes or combination shown in FIGS. 2 and 3, and may be implemented in other shapes or other combinations and/or couplings of components. For example, in another embodiment, the first housing 210 and the first rear cover 280 may be integrally formed, and the second housing 220 and the second rear cover 290 may be integrally formed.

According to various embodiments, the first housing 210 may be coupled, directly or indirectly, with the hinge structure 202 to pivot around a first pivot axis (e.g., a first pivot axis C1 of FIG. 4), and include the first surface 210a facing in a first direction (e.g., the +Z direction) and a second surface 210b facing in a second direction (e.g., the −Z direction) opposite to the first direction. The second housing 220 may be coupled, directly or indirectly, with the hinge structure 202 to pivot around a second pivot axis (e.g., a second pivot axis C2 of FIG. 4), include the third surface 220a facing in a third direction, and the fourth surface 220b facing in a fourth direction opposite to the third direction, and rotate around the hinge structure 202 with respect to the first housing 210. The third direction may indicate the Z-axis direction, and be defined as the +Z direction or the −Z direction according to the flat state or the folded state. For example, the electronic device 200 may change to the folded state or the unfolded state. In an embodiment, a distance between the first pivot axis C1 and the second pivot axis C2 may be set in various manners according to the design of the hinge structure or hinge module 202. In a certain embodiment, the first pivot axis C1 and the second pivot axis C2 may be formed substantially parallel, and in another embodiment, the first pivot axis C1 and the second pivot axis C2 may coincide with each other, forming a folding axis A of FIG. 2. The configuration of the hinge structure or hinge module 202 will be further described with reference to FIG. 5.

Figure 5:
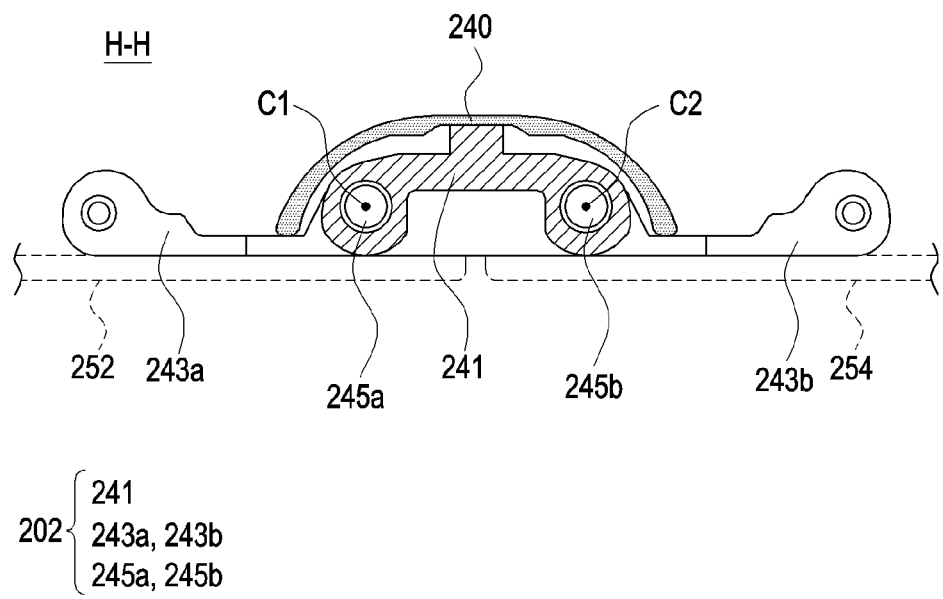
FIG. 5 is a cross-sectional view illustrating a hinge structure or hinge module of an electronic device according to various example embodiments.

FIG. 5 is a cross-sectional view illustrating the hinge structure or hinge module 202 in an electronic device (e.g., the electronic device 200 of FIGS. 2 to 4) according to various example embodiments.

Further referring to FIG. 5, the hinge structure or hinge module 202 may include a hinge bracket 241, hinge arms 243a and 243b, and/or pivot pins 245a and 245b. In an embodiment, a plurality (e.g., a pair) of hinge structures or hinge modules 202 may be disposed spaced apart from each other within the electronic device 200. For example, a pair of hinge modules 202 may be arranged at a predetermined spacing along the Y-axis direction. In an embodiment, a wiring (not shown) electrically connecting, directly or indirectly, internal components of the first housing 210 and the second housing 220 may be disposed in the gap or space between the pair of hinge modules 202 (each hinge module comprising a hinge), intersecting the first pivot axis C1 and/or the second pivot axis C2.

According to various embodiments, the hinge bracket 241 may be substantially accommodated inside the hinge cover 240 and fixed to an inner surface of the hinge cover 240. In an embodiment, the first hinge arm 243a among hinge arms 243a and 243b may be disposed or fixed on a first mid plate 252 and pivotably coupled with the hinge bracket 241. For example, the first pivot pin 245a out of the pivot pins 245a and 245b may pivotably couple the first hinge arm 243a with the hinge bracket 241. In another embodiment, the second hinge arm 243b among the hinge arms 243a and 243b may be disposed or fixed on a second mid plate 254 and pivotably coupled with the hinge bracket 241. For example, the second pivot pin 245b out of the pivoting pins 245a and 245b may pivotably couple the second hinge arm 243b with the hinge bracket 241.

According to various embodiments, the first pivot axis C1 and the second pivot axis C2 may be substantially formed by the pivot pins 245a and 245b. For example, the pivot pins 245a and 245b may be rotatably disposed on the hinge bracket 241 while being maintained parallel to the Y axis. In a certain embodiments, the pivot pins 245a and 245b may be fixed to the hinge bracket 241, and the hinge arms 243a and 243b may be rotatably or pivotably coupled, directly or indirectly, with the pivot pins 245a and 245b. According to an embodiment, the distance between the first pivot axis C1 and the second pivot axis C2 may be set according to the distance between the pivot pins 245a and 245b on the hinge bracket 241.

According to various embodiments, when the electronic device 200 is in the folded state, the first surface 210a may face the third surface 220a, and when the electronic device 200 is in the flat state, the third direction may coincide with the first direction. For example, the first housing 210 and the second housing 220 may pivot with respect to each other between a first position at which the first housing 210 and the second housing 220 are folded to face each other and a second position at which the first housing 210 and the second housing 220 are unfolded at a specified angle (e.g., 180 degrees) from the first position. According to an embodiment, when the electronic device 200 is unfolded, the first and third directions may be the +Z direction, and the second and fourth directions may be the −Z direction. According to an embodiment, when the electronic device 200 is folded, the first and fourth directions may be the +Z direction, and the second and third directions may be the −Z direction. Unless otherwise stated, directions will be described based on the flat state of the electronic device 200.

According to various embodiments, the first housing 210 and the second housing 220 may be disposed on both sides of the folding axis A and symmetrical in shape with respect to the folding axis A on the whole. As described later, the angle or distance between the first housing 210 and the second housing 220 may be different depending on whether the electronic device 200 is in the flat state, the folded state, or an intermediate state. According to an embodiment, although the second housing 220 further includes the sensor area 224 in which various sensors are disposed unlike the first housing 210, the second housing 220 may have a symmetrical shape in the other area.

According to various embodiments, the electronic device 200 may include a structure into which a digital pen (e.g., a stylus pen) may be inserted. For example, a hole 223 into which a digital pen is insertable may be formed into a side surface of the first housing 210 or the second housing 220 of the electronic device 200. Since the digital pen is insertable into the hole 223, a user may be relieved of inconvenience involved in separately carrying the digital pen.

According to various embodiments, as illustrated in FIG. 2, the first housing 210 and the second housing 220 may together form a recess that accommodates the display 230. According to an embodiment, the display 230 may have a partially asymmetrical shape due to the sensor area 224.

According to various embodiments, the first housing 210 and the second housing 220 may be formed at least partially of a metal material or a non-metal material having a specified rigidity to support the display 230. At least a part made of a metal material may provide a ground plane of the electronic device 200 and be electrically connected, directly or indirectly, to a ground line formed on a printed circuit board (e.g., circuit boards 262 and 264 of FIG. 4).

According to various embodiments, the sensor area 224 may be formed to have a predetermined area adjacent to one corner of the second housing 220. However, the arrangement, shape, and size of the sensor area 224 are not limited to the illustrated example. For example, in another embodiment, the sensor area 224 may be provided in another corner of the second housing 220 or in any area between a top corner and a bottom corner. In an embodiment, components for performing various functions embedded in the electronic device 200 may be exposed on the front surface of the electronic device 200 through the sensor area 224 or through one or more openings provided in the sensor area 224. In various embodiments, the components may include various types of sensors. The sensors may include, for example, at least one of a front camera, a receiver, an illuminance sensor, or a proximity sensor.

According to various embodiments, the first rear cover 280 may be disposed on the rear surface of the electronic device 200 (e.g., the first housing 210) on one side of the folding axis A and have, for example, a substantially rectangular periphery, which may be surrounded by the first housing 210. Similarly, the second rear cover 290 may be disposed on the rear surface of the electronic device 200 (e.g., the second housing 220) on the other side of the folding axis A, and the periphery thereof may be surrounded by the second housing 220.

According to various embodiments, the first rear cover 280 and the second rear cover 290 may be substantially symmetrical in shape with respect to the folding axis (the axis A). However, the first rear cover 280 and the second rear cover 290 are not necessarily symmetrical in shape, and in another embodiment, the electronic device 200 may include the first rear cover 280 and the second rear cover 290 in various shapes. In another embodiment, the first rear cover 280 may be integrally formed with the first housing 210, and the second rear cover 290 may be integrally formed with the second housing 220.

According to various embodiments, the first rear cover 280, the second rear cover 290, the first housing 210, and the second housing 220 may form a space in which various components (e.g., a printed circuit board or a battery) of the electronic device 200 may be disposed. According to an embodiment, one or more components may be disposed or visually exposed on the rear surface of the electronic device 200. For example, the electronic device 200 may include a sub-display which is at least partially exposed visually through a first rear area 282 of the first rear cover 280. In another embodiment, one or more components or sensors may be visually exposed through a second rear area 292 of the second rear cover 290. In various embodiments, the sensors exposed through the second rear area 292 may include a proximity sensor and/or a rear camera.

According to various embodiments, a front camera exposed on the front surface of the electronic device 200 through one or more openings provided in the sensor area 224 or a rear camera exposed through the second rear area 292 of the second rear cover 290 may include one or more lenses, an image sensor, and/or an image signal processor. In a certain embodiment, a flash including, for example, a light emitting diode or a xenon lamp may be disposed in the second rear area 292. In a certain embodiment, two or more lenses (an IR camera, a wide-angle lens, and a telephoto lens) and image sensors may be disposed on one surface of the electronic device 200.

Referring to FIG. 3, the hinge cover 240 may be disposed between the first housing 210 and the second housing 220 and configured to accommodate and cover internal components (e.g., the hinge structure or hinge module 202 of FIG. 4). According to an embodiment, the hinge cover 240 may be covered by the first housing 210 and the second housing 220 or exposed to the outside according to a state (the flat state or the folded state) of the electronic device 200. In an embodiment, at the first position, for example, in the folded state illustrated in FIG. 3, the first housing 210 and the second housing 220 may be folded, substantially facing each other, and the hinge cover 240 may be visually exposed to an external space. In another embodiment, at the second position, for example, in the flat state illustrated in FIG. 2, the first housing 210 and the second housing 220 may be unfolded at an angle of 180 degrees from the first position, and the hinge cover 240 may be substantially concealed by the first housing 210 and the second housing 220. In another example, when the first housing 210 and the second housing 220 are in the intermediate state in which they are folded with a certain angle, the hinge cover 240 may be partially exposed to the outside between the first housing 210 and the second housing 220. In this case, however, an exposed area may be smaller than in a fully folded state. In an embodiment, the hinge cover 240 may include a curved surface.

According to various embodiments, the display 230 may be disposed in a space formed by the housings 210 and 220. For example, the display 230 may be seated in a recess formed by the housings 210 and 220 and form most of the front surface of the electronic device 200. Accordingly, the front surface of the electronic device 200 may include a partial area of the first housing 210 and a partial area of the second housing 220, which are adjacent to the display 230. Further, the rear surface of the electronic device 200 may include the first rear cover 280, a partial area of the first housing 210 adjacent to the first rear cover 280, the second rear cover 290, and a partial area of the second housing 220 adjacent to the second rear cover 290.

According to various embodiments, the display 230 may refer to a flexible display having at least a partial area deformable into a flat or curved surface. According to an embodiment, the display 230 may include a folding area 233, a first area 231 disposed on one side of the folding area 233 (e.g., a left side of the folding area 233 illustrated in FIG. 2) and a second area 232 disposed on the other side of the folding area 233 (e.g., a right side of the folding area 233 illustrated in FIG. 2).

However, the area division of the display 230 illustrated in FIG. 2 is exemplary, and the display 230 may be divided into a plurality of (e.g., four or more or two) areas according to a structure or function. For example, although the area of the display 230 may be divided by the folding area 233 extending parallel to the Y axis or the folding axis (the axis A) in the embodiment illustrated in FIG. 2, the area of the display 230 may be divided by another folding area (e.g., a folding area parallel to the X axis) or another folding axis (e.g., a folding axis parallel to the X axis) in another embodiment. According to an embodiment, the display 230 may be combined with or disposed adjacent to a touch sensing circuit, a pressure sensor capable of measuring the intensity (pressure) of a touch, and/or a digitizer configured to detect a magnetic stylus pen.

According to various embodiments, the first area 231 and the second area 232 may be symmetrical in shape with respect to the folding area 233 on the whole. However, unlike the first area 231, the second area 232 may include a cut notch or a transparent area according to the existence of the sensor area 224, and may be symmetrical to the first area 231 in the other area. In other words, the first area 231 and the second area 232 may include parts having a symmetrical shape and parts having an asymmetrical shape.

Operations of the first housing 210 and the second housing 220 and each area of the display 230 according to the states (e.g., the unfolded state or flat state, and the folded state) of the electronic device 200 will be described below.

According to various embodiments, when the electronic device 200 is in the flat state (e.g., the state illustrated in FIG. 2), the first housing 210 and the second housing 220 may be at a specified angle, for example, 180 degrees, and the first area 231 and the second area 232 of the display 230 may be disposed to face in the same direction. For example, the surface of the first area 231 and the surface of the second area 232 of the display 230 may form an angle of 180 degrees and face in the same direction (e.g., the front direction of the electronic device 200). The folding area 233 may form the same plane as the first area 231 and the second area 232.

According to various embodiments, when the electronic device 200 is in the folded state (e.g., the state illustrated in FIG. 3), the first housing 210 and the second housing 220 may face each other. The surface of the first area 231 and the surface of the second area 232 of the display 230 may form a narrow angle (e.g., between 0 degrees and 10 degrees) and face each other. At least a part of the folding area 233 may be formed into a curved surface having a specified curvature.

According to various embodiments, when the electronic device 200 is in the intermediate state, the first housing 210 and the second housing 220 may be disposed at a certain angle with respect to each other, for example, any angle between the first position of FIG. 3 and the second position of FIG. 2. The surface of the first area 231 and the surface of the second area 232 of the display 230 may be disposed to form an angle greater than in the folded state and smaller than in the flat state. At least a part of the folding area 233 may be formed into a curved surface having a predetermined curvature, which may be smaller than in the folded state.

Referring to FIG. 4, the electronic device 200 may include the housings 210 and 220, the display 230, and the circuit boards 262 and 264. The housings 210 and 220 may include the first housing 210, the second housing 220, a bracket assembly 250, the first rear cover 280, the second rear cover 290, and the hinge structure 202.

According to various embodiments, the display 230 may include a display panel 235 and at least one support plate 237 on which the display panel 235 is seated. The support plate 237 may be disposed between the display panel 235 and the bracket assembly 250.

According to various embodiments, the bracket assembly 250 may include the first mid plate 252 and the second mid plate 254. The hinge structure or hinge module 202 may be disposed between the first mid plate 252 and the second mid plate 254. When viewed from the outside, the hinge module 202 may be covered by the hinge cover (e.g., the hinge cover 240 of FIG. 3). According to an embodiment, a wiring (not shown) crossing the first mid plate 252 and the second mid plate 254 may be disposed on the bracket assembly 250.

According to various embodiments, the circuit boards 262 and 264 may include a first circuit board 262 disposed on the first mid plate 252 and a second circuit board 264 disposed on the second mid plate 254. The first circuit board 262 and the second circuit board 264 may be disposed inside a space formed by the bracket assembly 250, the first housing 210, the second housing 220, the first rear cover 280, and the second rear cover 290. Electrical/electronic components for implementing various functions of the electronic device 200 may be mounted on the first circuit board 262 and the second circuit board 264. In a certain embodiment, each of the first circuit board 262 and the second circuit board 264 may be interpreted as one of electrical/electronic components.

According to various embodiments, with the display 230 coupled, directly or indirectly, with the bracket assembly 250, the first housing 210 and the second housing 220 may be assembled to be coupled, directly or indirectly, with both sides of the bracket assembly 250. For example, the first housing 210 may include a first side member 211 surrounding at least a part of a side surface of the first mid plate 252, and the second housing 220 may include a second side member 221 surrounding at least a part of a side surface of the second mid plate 254. The first housing 210 may include a first rotation support surface 212, and the second housing 220 may include a second rotation support surface 222 corresponding to the first rotation support surface 212. The first rotation support surface 212 and the second rotation support surface 222 may include curved surfaces corresponding to the curved surface included in the hinge cover 240. According to an embodiment, the first side member 211 may include a first side surface 211*a* at least partially surrounding a space between the first surface 210*a* and the second surface 210*b* and perpendicular to the first direction or the second direction. According to an embodiment, the second side member 221 may include a second side surface surrounding at least a part between the third and fourth surfaces 220*a* and 220*b* and perpendicular to the third or fourth direction.

According to an embodiment, when the electronic device 200 is in the flat state (e.g., the electronic device of FIG. 2), the first rotation support surface 212 and the second rotation support surface 222 may conceal the hinge cover 240, and thus the hinge cover 240 may not be exposed or minimally exposed on the rear surface of the electronic device 200. In another example, when the electronic device 200 is in the folded state (e.g., the electronic device of FIG. 3), the first rotation support surface 212 and the second rotation support surface 222 may expose the hinge cover 240 maximally to the external space of the electronic device 200.

According to various embodiments, the electronic device 200 may include at least one battery 269a and 269b. For example, the electronic device 200 may include the batteries 269a and 269b disposed in one of the housings 210 and 220 or respectively in the two housings 210 and 220. The batteries 269a and 269b may be substantially disposed adjacent to the circuit boards 262 and 264 and supply power to at least one component of the electronic device 200. According to an embodiment, the batteries 269a and 269b may include, for example, a non-rechargeable primary battery, a rechargeable secondary battery, or a fuel cell.

According to various embodiments, a relative displacement may occur between different parts of the electronic device 200 during a folding or unfolding operation. For example, as the housings 210 and 220 move with respect to the hinge cover 240 in the folding or unfolding operation, the hinge cover 240 may be concealed or exposed to the external space. In an embodiment, the rear surface of the electronic device 200 (e.g., the surface facing in the opposite direction of the surface on which the display 230 is disposed) may appear to be expanded relative to the front surface of the electronic device 200, for example, the surface on which the display 230 is disposed in the folding operation. In another embodiment, the front surface of the electronic device 200 may appear to be contracted relative to the rear surface of the electronic device 200 in the folding operation. For example, in the folding or unfolding operation, a relative displacement may occur between the front and rear surfaces of the electronic device 200. This relative displacement may be proportional to the thickness of the electronic device 200 (e.g., a thickness measured in the Z-axis direction). In a certain embodiment, the display 230 is a structure or electronic component which is not substantially expandable or contractible, and the relative displacement may be allowed through movement of the housings 210 and 220 relative to the hinge cover 240 or selective exposure of the hinge cover 240 on the rear surface of the electronic device 200.

According to various embodiments, the display 230 may include a light emitting layer (e.g., a first layer L1 of FIG. 6 or 10) including multiple pixels (e.g., pixels P1, P2, and P3 of FIG. 10), and a protective layer (e.g., a second layer L2 of FIG. 6 or 10 as a window sheet or glass plate), and further include at least one other layer (e.g., a third layer L3 of FIG. 6 or 10 as a polarization plate, an electrode layer for touch sensing, a printed layer, a decorative film, and/or at least one adhesive layer bonding adjacent layers to each other) between the light emitting layer and the protective layer. A relative displacement may occur within the display 230 according to the unfolding or folding operation. For example, the protective layer may appear to be contracted or expanded with respect to the light emitting layer in the unfolding or folding operation. The relative displacement within the display 230 will be further described with reference to FIGS. 6 and 7.

Figure 6:
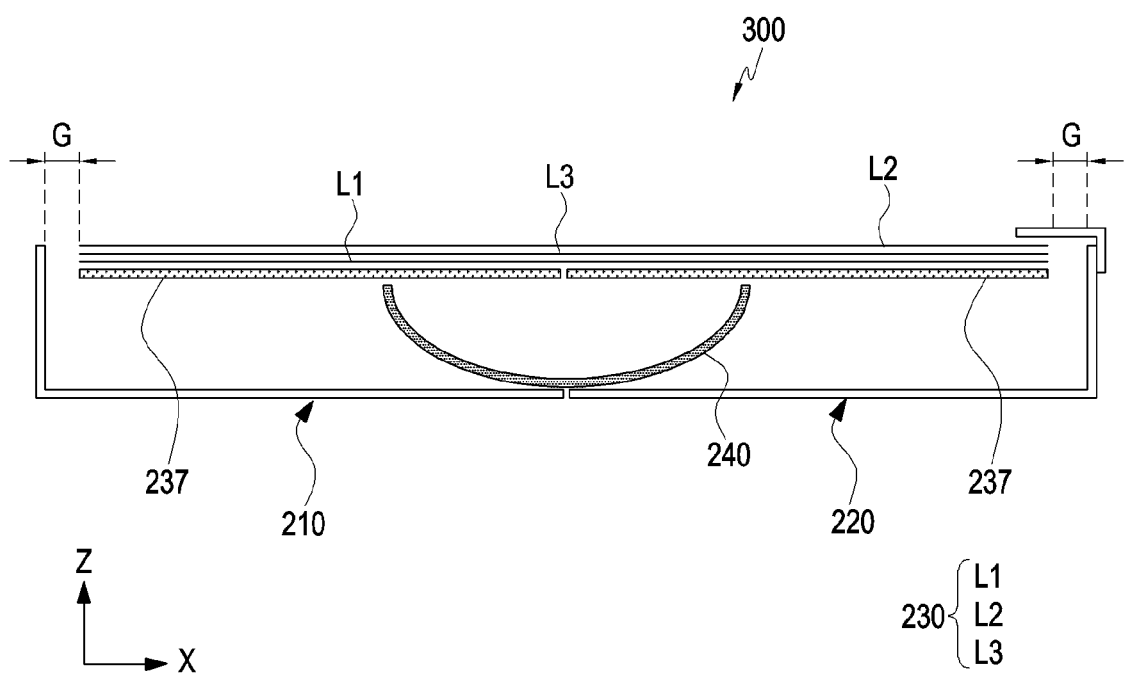
FIG. 6 is a cross-sectional diagram illustrating the configuration of an electronic device in a flat state according to various example embodiments.
Figure 7:
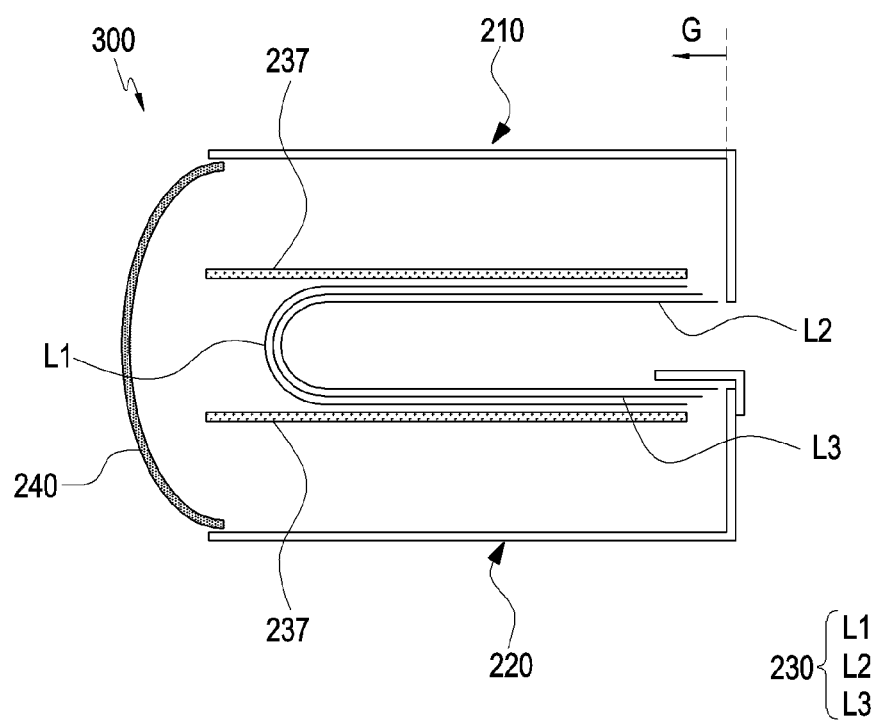
FIG. 7 is a cross-sectional diagram illustrating the configuration of an electronic device in a folded state according to various example embodiments.

FIG. 6 is a cross-sectional diagram illustrating the configuration of an electronic devices 300 (e.g., the electronic devices 101, 102, 104, and 200 of FIGS. 1 to 4) in the flat state according to various example embodiments. FIG. 7 is a cross-sectional diagram illustrating the configuration of the electronic device 300 in the folded state according to various example embodiments.

Referring to FIGS. 6 and 7, the display 230 may include the first layer L1 (e.g., the light emitting layer) disposed on the support plate 237, the second layer L2 (e.g., the protective layer) substantially forming an outer surface, and at least one third layer L3 disposed between the first layer L1 and the second layer L2. In a certain embodiment, the support plate 237 may be interpreted substantially as a component of the display 230. The display panel 235 of FIG. 4 may be interpreted as a component including the first layer L1 and the at least one third layer L3. In a certain embodiment, when a plurality of third layers L3 are provided, some or all of the plurality of third layers L3 may be interpreted as being included in the display panel 235 of FIG. 4.

According to various embodiments, the first layer L1 may be disposed closer to the rear surface (e.g., the surface facing in the −Z direction in FIG. 6) of the electronic device 300 than the other layers of the display 230, and include a plurality of pixels (e.g., the pixels P1, P2, and P3 of FIG. 10) to receive an electrical signal and output visual information (e.g., text, an image, or a video). The second layer L2 is a layer directly exposed to the external space, and may protect the other layers forming the display 230 from an external environment. The second layer L2 may include, for example, a synthetic resin film such as formed of polyimide, acryl, and/or polycarbonate (PC), or thin glass, and an exposed surface thereof may be coated with a material having scratch resistance, such as an ultraviolet curing resin. In an embodiment, the third layer L3 may include, for example, a polarization plate, and according to an embodiment, further include an electrode layer for touch sensing, a printed layer, a decorative film, and/or at least one adhesive layer bonding adjacent layers to each other.

According to various embodiments, in the flat state of FIG. 6, both ends of the layers L1, L2, and L3 may be aligned or positioned at a specified distance or gap G from inner walls of the housings 210 and 220. When each of the housings 210 and 220 is unfolded on one side of the other, the front surface (e.g., the surface facing in the +Z direction in FIG. 6 on which the display 230 is disposed) and the rear surface of the electronic device 300 may have substantially the same length in the X-axis direction. In the folded state of FIG. 7, when the housings 210 and 220 are folded to face each other, the hinge cover 240 may be exposed to the outside, and thus the length of the rear surface of the electronic device 300 may become greater than that of the front surface thereof. As described above, the display 230 is a structure or electronic component that is not substantially expandable or contractible, and relative movement (e.g., pivoting) between the housings 210 and 220 and the hinge cover 240 may allow the folding or unfolding operation, while suppressing a substantial length change of the display 230.

According to various embodiments, a relative movement or displacement may occur among the layers L1, L2, and L3 of the display 230 during the unfolding operation or the folding operation. For example, the second layer L2 may be located closest to the inner walls of the housings 210 and 220, relative to the first layer L1 disposed on the innermost side of the display 230, in the folded state. Referring to the folded state illustrated in FIG. 7, the second layer L2 may be located to be surrounded by the first layer L1, have a smaller radius of curvature in a bent area (e.g., the folding area 133 of FIG. 2) than the first layer L1, and move to the right with respect to the first layer L1. For example, when the layers L1, L2, and L3 of the display 230 are aligned at the same distance or gap G from the inner walls of the housings 210 and 220 in the flat state, the gap G from the inner walls of the housings 210 and 220 may be different for the layers L1, L2, and L3 in the folded state. The difference in the gap G between the folded state and the flat state may be proportional to the thickness of the display 230 (e.g., the thickness measured in the Z-axis direction in FIG. 6). The gap G illustrated in FIG. 6 may allow a relative movement or displacement among the layers L1, L2, and L3 of the display 230 and prevent or reduce at least one (e.g., the second layer of FIG. 7) of the layers L1, L2, and L3 of the display 230 from directly contacting the inner walls of the housings 210 and 220.

According to various embodiments, the relative movement or displacement among the layers L1, L2, and L3 of the display 230 may be visually perceived. For example, when the third layer L3 includes a decorative layer or a printed layer (e.g., a printed layer L3' of FIG. 8) such as a pattern or a character, and/or when the printed layer L3' is provided between the second layer L2 and the third layer L3, relative movement of the printed layer L3' with respect to the first layer L1 may be visually recognized by the user. This relative movement will be further described with reference to FIGS. 8 and 9. Although the configuration of the printed layer L3' formed on the outer surface of the second layer L2 is exemplified in FIGS. 8 and 9, this illustrates the position of a sensor area (e.g., the sensor area 224 of FIG. 2) or an electronic component (e.g., the printed layer L3' in the X-axis direction with respect to the sensor module 176 of FIG. 1, the camera module 180 of FIG. 1, and/or the camera module 276 of FIG. 8), and it is to be noted that the printed layer L3' may be formed on the inner surface of the second layer L2 (e.g., between the second layer L2 and the third layer L3). In describing the embodiment of FIGS. 8 and 9, it may be defined that a direction in which the camera module 276 obtains light is parallel to the Z axis, and a relative displacement is made among the layers L1, L2, L3, and L3' of the display 230 along the X-axis direction.

Figure 8:
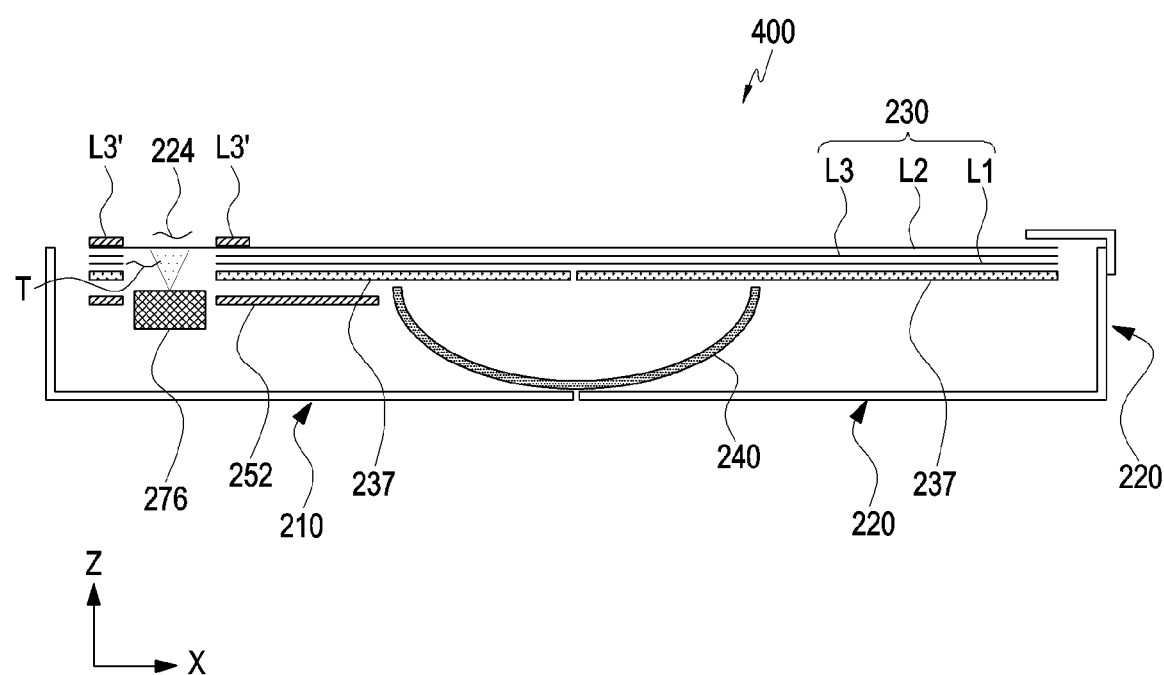
FIG. 8 is a cross-sectional diagram illustrating the configuration of an electronic device in a flat state according to one of various example embodiments.
Figure 9:
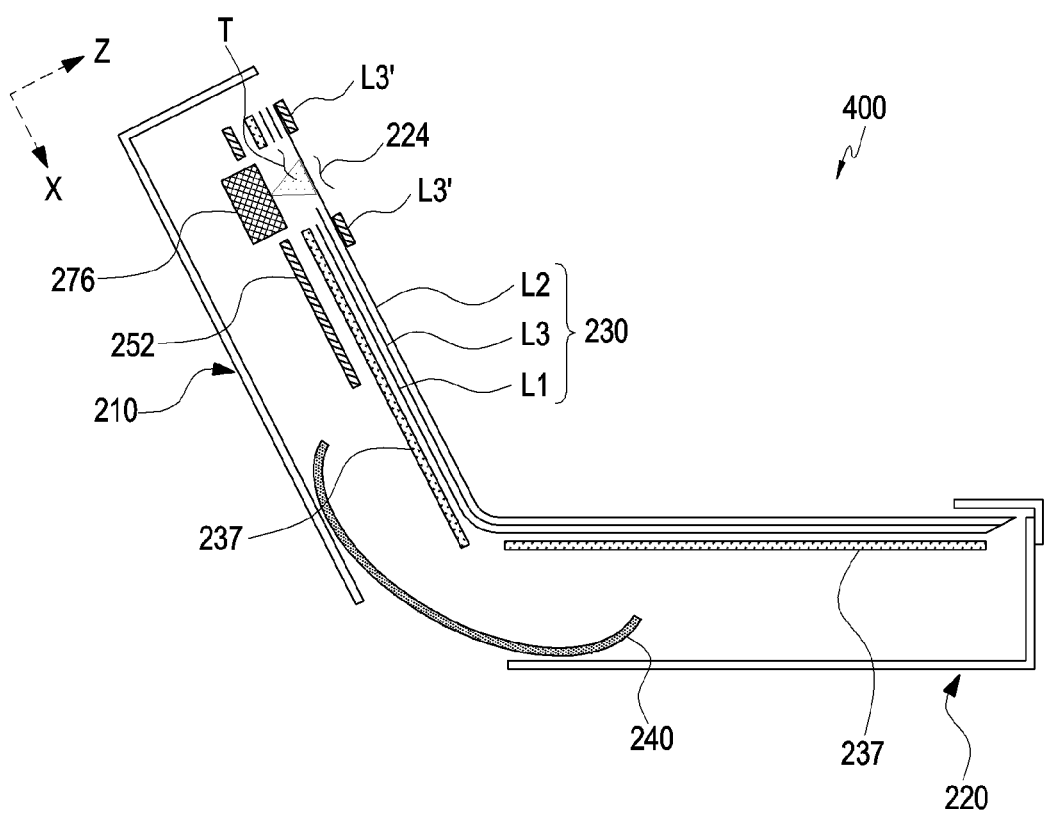
FIG. 9 is a cross-sectional diagram illustrating housings positioned inclined to each other in an electronic device according to one of various example embodiments.

FIG. 8 is a cross-sectional diagram illustrating the configuration of an electronic device 400 (e.g., the electronic devices 101, 102, 104, and 200 of FIGS. 1 to 4) in the flat state according to one of various example embodiments. FIG. 9 is a cross-sectional view illustrating the configuration of the electronic device 400 in a state in which the housings 210 and 220 are inclined to each other according to one of various example embodiments.

Referring to FIGS. 8 and 9, the electronic device 400 may include a sensor, for example, the camera module 276 (e.g., the sensor module 176 or the camera module 180 of FIG. 1) located in correspondence with a sensor area (e.g., the sensor area 224 of FIG. 2). The camera module 276 may be disposed on a support member (e.g., the first mid plate 252 of FIG. 4) and obtain light in a path passing through a part (e.g., a transparent area T) of the display 230. The display 230 may be substantially transparent in a part or area corresponding to the sensor area 224 or the camera module 276 to allow external light to enter the camera module 276. In the display 230, the 'substantially transparent area' may be interpreted as an area in which there are no pixels outputting light. As described later, in a structure in which a sensor (e.g., the camera module 276) is disposed to overlap with the display 230, a part of the display 230 (e.g., the first layer L1 or the light emitting layer) may not output a screen or light. The area that is a part of the display 230 and does not output a screen or light may be defined as a 'dead space (e.g., a dead space DS in FIG. 10)' or a 'dead zone'. In another embodiment, transparent areas provided in the plurality of layers L1, L2, and L3 may be aligned to provide the transparent area T of the display 230, and the sensor area 224 may be formed in correspondence with a part of the transparent area T of the display 230. For example, the printed layer L3' may conceal edges of the transparent areas provided in the plurality of layers L1, L2, and L3, while defining the sensor area 224. In another embodiment, the printed layer L3' may be formed to define the sensor area, while further concealing a boundary between an area where pixels (e.g., pixels P1, P2, and P3 of FIG. 10) are disposed and an area (e.g., an area denoted by 'NP' in FIG. 10) where pixels are not disposed. In another embodiment, while not shown, the dead space may include a first part corresponding to the transparent area T and a second part around the first part. The first part may be transparent and thus transmit light, whereas the second part may be substantially opaque and thus block light.

According to various embodiments, as the camera module 276, the transparent area T of the display 230, and/or the printed layer L3' (e.g., the sensor area 224) are aligned, a path in which external light is incident on the camera module 276 may be provided. In the flat state of FIG. 8, the camera module 276, the transparent area T of the display 230, and/or the sensor area 224 may be aligned along a Z-axis direction d, and the incident path of light may be substantially parallel to the Z axis. According to an embodiment, a relative displacement may occur among the layers L1, L2, L3, and L3" of the display 230 in the folding operation. In the flat state, the housings 210 and 220 may be located at an angle of approximately 180 degrees with respect to each other, and a state in which the layers L1, L2, L3, and L3' of the display 230 are aligned as illustrated in FIG. 6 or 8 is defined as a 'first alignment state'. As the angle between the housings 210 and 220 is gradually decreased according to the folding operation, the layers L1, L2, L3, and L3' of the display 230 may be gradually moved or deformed relative to each other, switching to an alignment state different from the first alignment state. Referring to FIG. 9, the second layer L2 and/or the printed layer L3' (e.g., the sensor area 224) may move in the −X direction with respect to the first layer L1 in the first housing 210. For example, the camera module 276 may be substantially fixed to the first mid plate 252 and/or the first layer L1, and the printed layer L3' or the sensor area 224 may move in the X-axis direction with respect to be the first layer L1 and/or the camera module 276.

According to various embodiments, with the housings 210 and 220 of the electronic device 400 unfolded or inclined relative to each other, the user may use the electronic device 400 by placing it on a flat surface (e.g., a desk or table). For example, the user may make a video call or watch broadcasting or a video, while the housings 210 and 220 of the electronic device 400 are mounted on a flat surface in an inclined state with respect to each other. In an embodiment, the printed layer L3' on the first layer L1 may be different according to the flat state or the inclined state due to a relative displacement among the layers L1, L2, L3, and L3' of the display 230. In a portable electronic device such as a mobile communication terminal, the position change of the printed layer L3 in the flat state and the folded state is within about 1 mm. Although it is difficult for the user to substantially perceive this position change, the position change may be visually recognizable to a user that adjusts the angle between the housings 210 and 220 variously and/or frequently. The exemplary given numerical value regarding the change in the position of the printed layer L3 according to the flat state and the folded state does not limit various example embodiments, and may vary according to the size (e.g., thickness) of an actually manufactured electronic device or flexible display. A displacement of the printed layer L3' and/or the sensor area 224 according to a change in the angle between the housings 210 and 220 will be described with reference to FIGS. 10 to 13.

Figure 10:
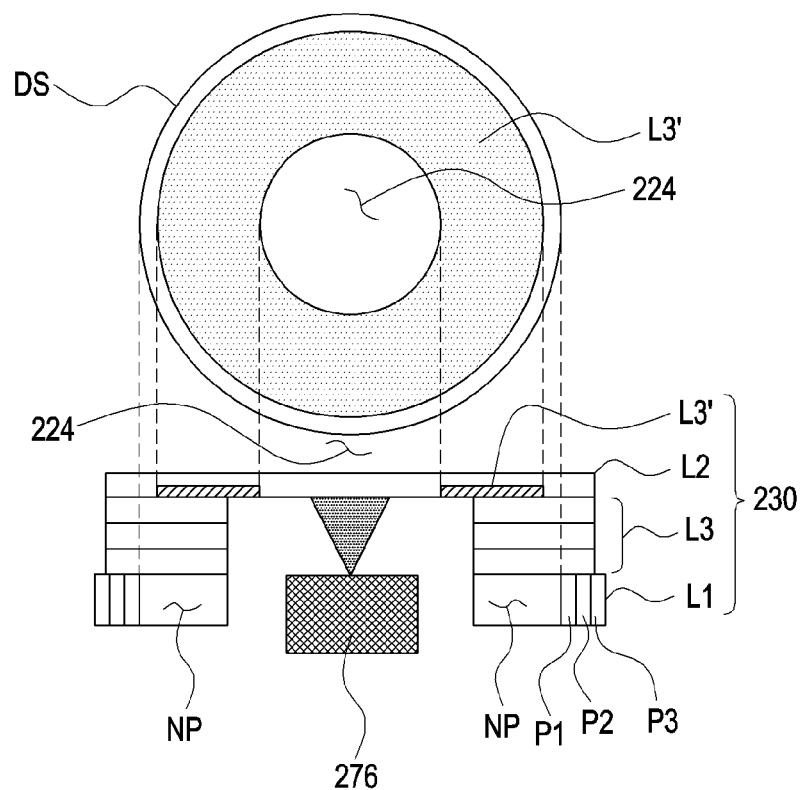
FIG. 10 is a diagram illustrating a plurality of layers in a first alignment state in a flexible display of an electronic device according to another of various example embodiments.
Figure 11:
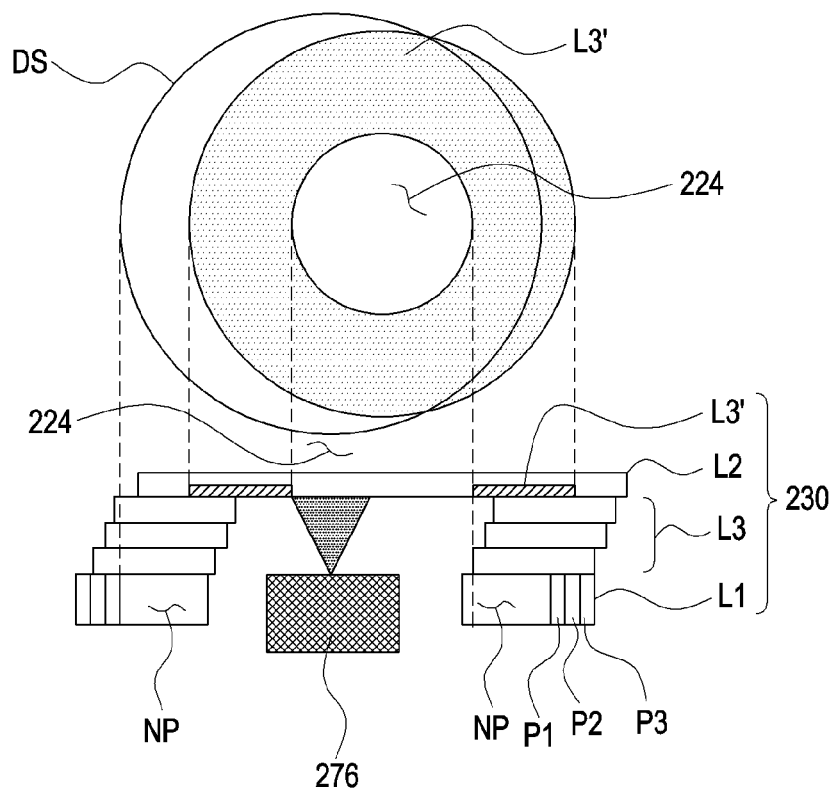
FIG. 11 is a diagram illustrating a plurality of layers in a second alignment state in a flexible display of an electronic device according to another of various example embodiments.

FIG. 10 illustrates the plurality of layers L1, L2, L3, and L3' in the first alignment state in the flexible display 230 (e.g., the display 230 of FIG. 2 and/or FIG. 4) in an electronic devices 101, 102, 104, and 200 of FIGS. 1 to 4) according to another one of various example embodiments. FIG. 11 illustrates the plurality of layers L1, L2, L3, and L3' in a second alignment state in the flexible display 230 in the electronic device according to another one of various example embodiments.

Referring to FIGS. 10 and 11, the printed layer L3 may be provided to secure a sufficient actual area in which the display 230 may output a screen, while concealing the edges of the transparent areas formed in the layers L1, L2, L3, and L3' of the display 230, even if a relative displacement occurs. For example, when viewed from the outside of the electronic device (e.g., the electronic device 200 of FIGS. 2 to 4), the area NP in which the pixels P1, P2, and P3 are not disposed, for example, the dead space DS may have a size corresponding to that of the printed layer L3'. In the first alignment state, for example, in the flat state of FIG. 2, the printed layer L3' and the dead space DS may be located substantially on concentric circles, in alignment with the camera module 276. When the dead space DS has a size corresponding to that of the printed layer L3', the sensor area 224 may move relative to the camera module 276, and the printed layer L3' may cover a part of the first layer L1, for example, the pixels P1, P2 and P3 in an area beyond the dead space DS in the folded state or in the second alignment state in which the housings 210 and 220 are inclined to each other, as illustrated in FIG. 11. For example, in the state in which the housings 210 and 220 are inclined to each other (e.g., the second alignment state of FIG. 11), a part of a screen output through the display 230 may be covered by the printed layer L3' and thus may not be transmitted to the user.

According to various embodiments, when the dead space DS and the printed layer L3' are concentrically aligned in the flat state, relative movement of the sensor area 224 with respect to the camera module 276 may cause misalignment between the centers of the dead space DS and the printed layer L3', as illustrated in FIG. 11. Although the change in the position of the printed layer L3' is a natural phenomenon caused by the relative positions of the housings 210 and 220, not a defect or damage of the electronic device 200/400, the user may not feel comfortable, when recognizing the change in position of the printed layer L3'.

Figure 12:
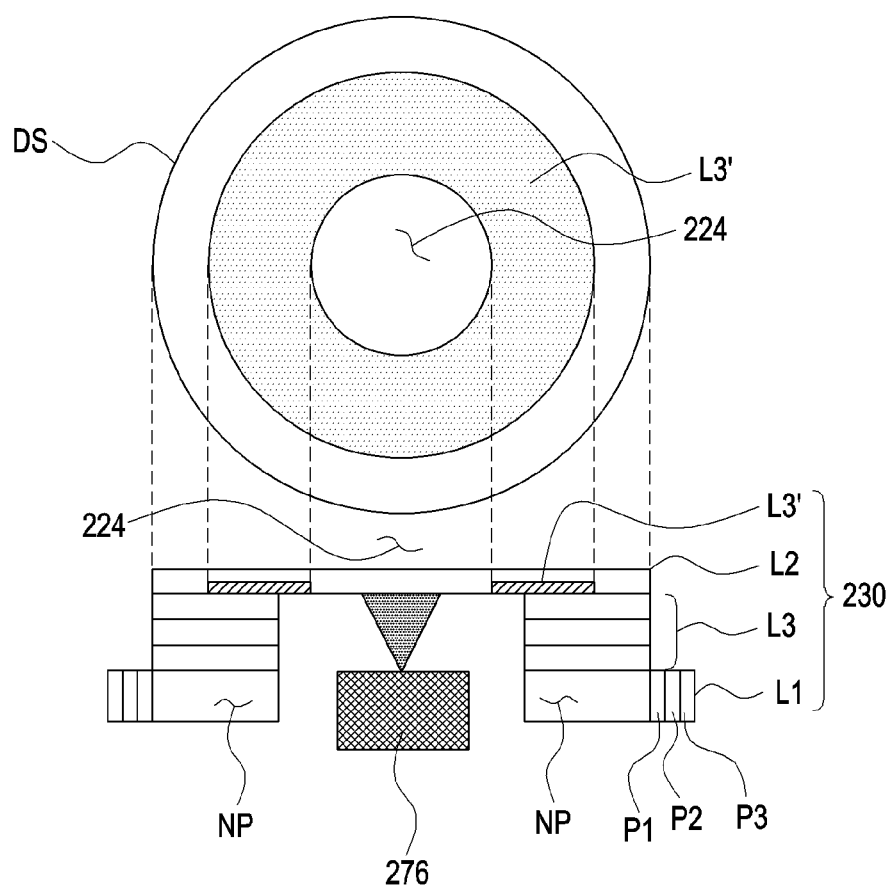
FIG. 12 is a diagram illustrating a plurality of layers in a first alignment state in a flexible display of an electronic device according to another of various example embodiments.
Figure 13:
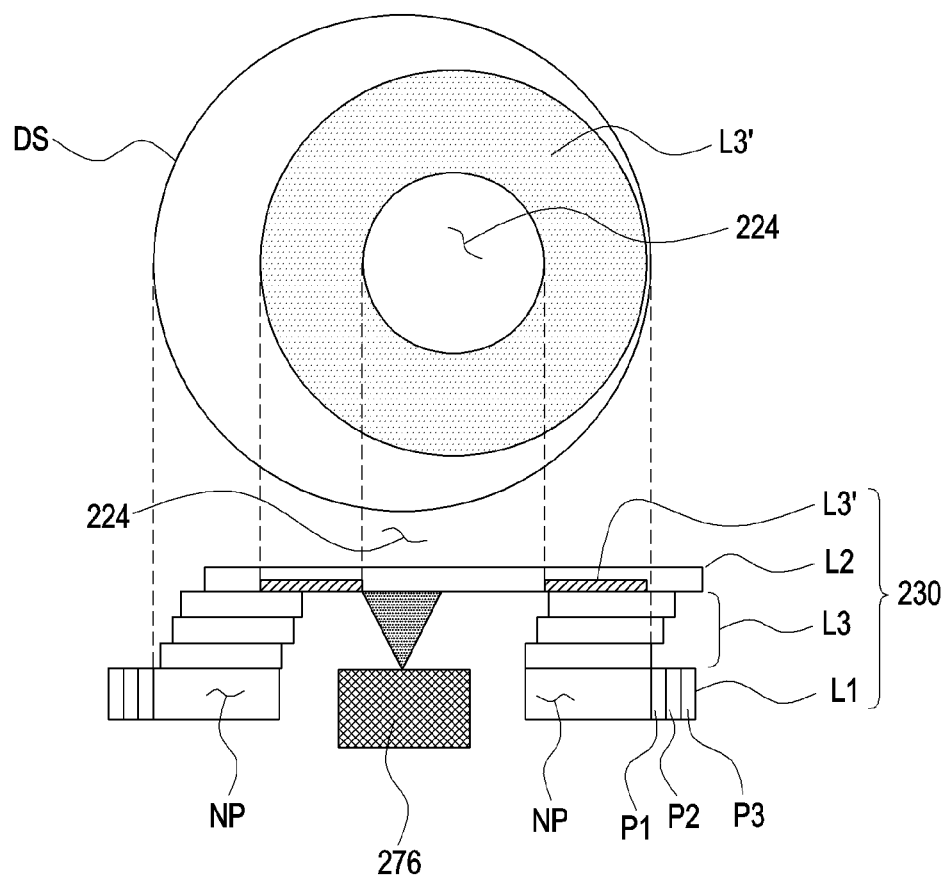
FIG. 13 is a diagram illustrating a plurality of layers in a second alignment state in a flexible display of an electronic device according to another of various example embodiments.

FIG. 12 illustrates the plurality of layers L1, L2, L3, and L3' in the first alignment state in the flexible display 230 (e.g., the display 230 of FIG. 2 and/or FIG. 4) in an electronic device (e.g., the electronic devices 101, 102, 104, and 200 of FIGS. 1 to 4) according to another one of various example embodiments. FIG. 13 illustrates the plurality of layers L1, L2, L3, and L3' in the second alignment state in the flexible display 230 in the electronic device according to another one of various example embodiments.

Referring to FIGS. 12 and 13, compared to the embodiment of FIGS. 10 and 11, a screen may not be blocked even when the printed layer L3' moves above the camera module 276 or the first layer L1 in a structure in which the area NP where the pixels P1, P2, and P3 are not arranged on the first layer L1 and/or the dead space DS is further extended. For example, when viewed from the outside of the electronic device, the printed layer L3' may not deviate from the dead space DS and may not substantially block a screen output from the display 230, even if a relative position change occurs. Although the center of the dead space DS and the center of the printed layer L3' may be slightly misaligned according to the change in the position of the printed layer L3' in the structure in which the dead space DS is extended, the printed layer L3' may not cover the output screen, thereby preventing or relieving the user's discomfort about defects or damage. In a certain embodiment, when the dead space DS and the printed layer L3' have the same color, the effect of preventing or relieving discomfort may be increased. However, extending the dead space DS may indicate that an area where a screen is displayed is substantially reduced.

A flexible display and/or an electronic device including the flexible display according to various example embodiments (e.g., the display 230 and/or the electronic device 200 of FIGS. 2 to 4) may have the dead space DS of a size substantially corresponding to the print layer L3', and prevent or relieve a user's discomfort caused by a change in relative position. For example, as the relative position of the printed layer L3' changes, the display 230 (e.g., the first layer L1 or the light emitting layer) may output a virtual dead space (e.g., a virtual dead space VS1 or VS2 of FIG. 14 or 15) having substantially the same color or brightness as the dead space DS. A configuration of implementing a virtual dead space will be further described with reference to FIGS. 14 and 15.

Figure 14:
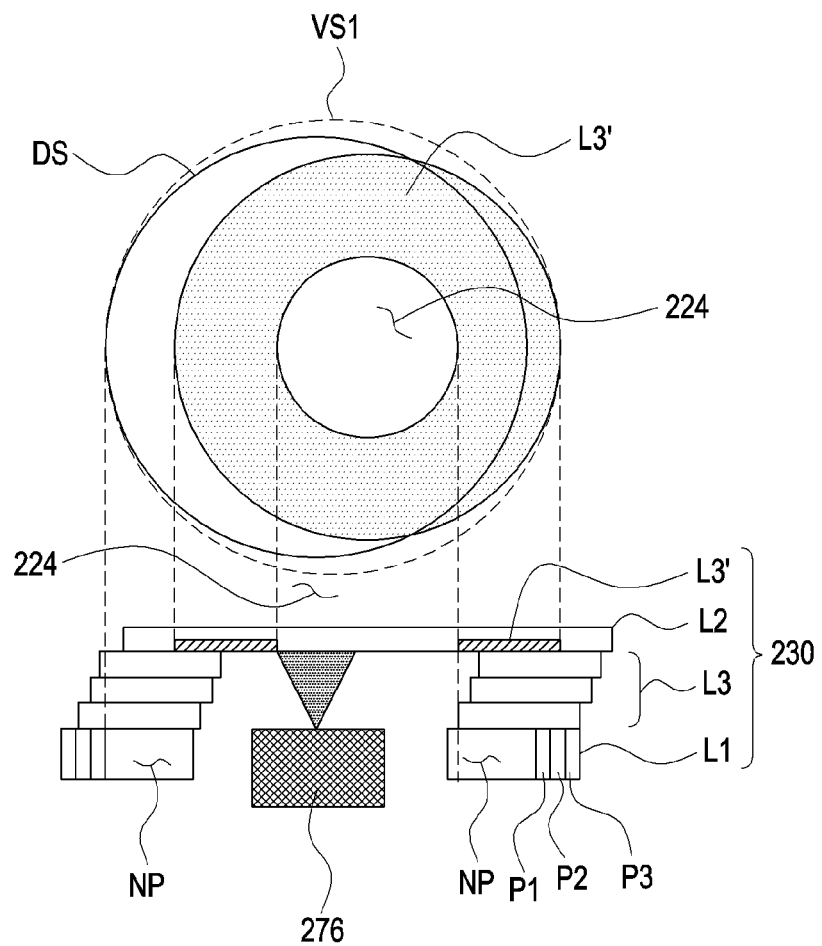
FIG. 14 is a diagram illustrating an exemplary user experience implemented by an electronic device according to various example embodiments.

FIG. 14 is a diagram illustrating an example of a user experience implemented by an electronic device (e.g., the electronic devices 101, 102, 104, and 200 of FIGS. 1 to 4) according to various example embodiments.

Referring to FIG. 14, the dead space DS, the printed layer L3', and/or the pixels P1, P2, and P3 of the first layer L1 (e.g., the light emitting layer) may be arranged in a similar manner to or the substantially same manner as FIG. 10. For example, a ratio of an area where a screen is output on the display 230 may be increased by minimizing or reducing the dead space DS. According to an embodiment, when the printed layer L3' moves out of the dead space DS and covers a screen (e.g., text, an image, or a video) output from the display 230, the electronic device (e.g., the processor 120 of FIG. 1) may output the virtual dead space VS1 on a part of the screen, and the printed layer L3' may be located not to deviate substantially from the virtual dead space VS1. The virtual dead space VS1 may be implemented in a circular or elliptical shape, and the position and size of the virtual dead space VS1 may be set in correspondence with an area in which the actual dead space DS and the printed layer L3' are disposed.

According to various embodiments, a relative displacement of the printed layer L3' or the sensor area 224 with respect to the camera module 276 (comprising a camera) and/or the first layer L1 (e.g., the dead space DS) may vary depending on the thickness of the display 230, a distance from a pivot axis (e.g., the folding axis A of FIG. 2 or the pivot axes C1 and C2 of FIG. 4), and an inclination angle (e.g., a folding angle) between the housings 210 and 220). For example, the relative displacement of the printed layer L3' or the sensor area 224 according to the inclination angle may be calculated in the process of designing the electronic device (e.g., the electronic devices 101, 102, 104, and 200 of FIGS. 1 to 4). The electronic device and/or the processor 120 of FIG. 1 may detect the inclination angle between the housings 210 and 220 in real time by using another sensor (e.g., a Hall sensor or the sensor module 176 of FIG. 1, comprising at least one sensor) and determine the position or size of the virtual dead space VS1 based on data (e.g., the difference in radius between the dead space DS and the printed layer L3' and/or the displacement of the printed layer L3' according to the inclination angle) calculated in the design process and the detected inclined angle.

Figure 15:
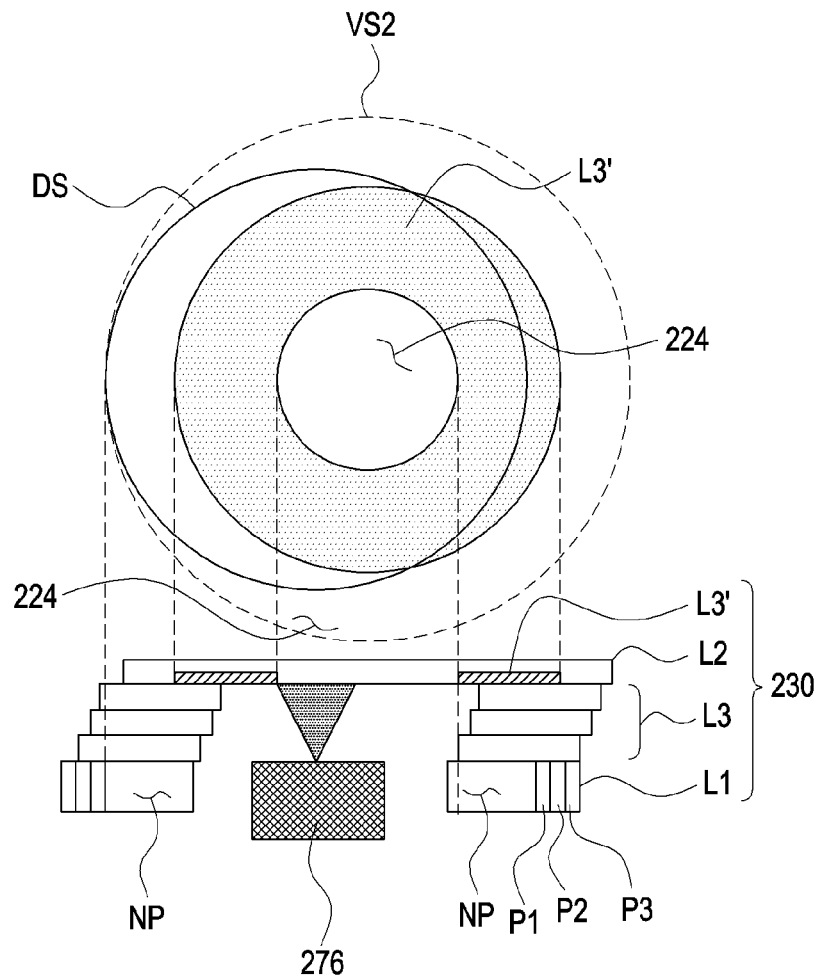
FIG. 15 is a diagram illustrating another exemplary user experience implemented by an electronic device according to various example embodiments.

FIG. 15 is a diagram illustrating another example of a user experience implemented by an electronic device (e.g., the electronic devices 101, 102, 104, and 200 of FIGS. 1 to 4) according to various example embodiments.

Referring to FIG. 15, the electronic device (e.g., the electronic device 101, 102, 104, 200 of FIGS. 1 to 4) and/or the processor 120 of FIG. 1 may determine the size and position of the virtual dead space VS2 based on the radius of the dead space DS and a displacement of the printed layer L3' (e.g., the sensor area 224). In the first alignment state of FIG. 10, the dead space DS and the printed layer L3' may be located on concentric circles, and when the printed layer L3' is displaced with respect to the dead space DS, the virtual dead space VS2 may be formed around the printed layer L3'. "Formation of the virtual dead space VS2" may indicate that a circle having substantially the same color as that of the dead space DS and/or the printed layer L3' is output on a screen. According to an embodiment, the virtual dead space VS2 may have a radius equal to the sum of the radius of the actual dead space DS and the displacement of the printed layer L3' and be located substantially on a circle concentric with that of the printed layer L3. For example, the electronic device (e.g., the electronic devices 101, 102, 104, 200 of FIGS. 1 to 4) and/or the processor 120 of FIG. 1 may determine the size of the virtual dead space based on the inclination angle between the housings 210 and 220 and the data calculated in the design process (e.g., the radius of the dead space D and the displacement of the printed layer according to the inclination angle), and output the virtual dead space on a screen at a position at which the virtual dead space forms a concentric circle with the printed layer.

According to various embodiments, compared to the embodiment illustrated in FIG. 14, the virtual dead space VS2 and the printed layer L3' may be disposed on a concentric circle in a larger size in the embodiment illustrated in FIG. 15. For example, although a screen area for outputting text, an image, or a video is somewhat reduced in the second alignment state of FIG. 15, the printed layer L3' may not cover the text, the image, or the video output from the display. In a certain embodiment, compared to the embodiment of FIG. 12 or 13, text, an image, or a video may be output using more areas in the first alignment state in the embodiment illustrated in FIG. 15.

Figure 16:
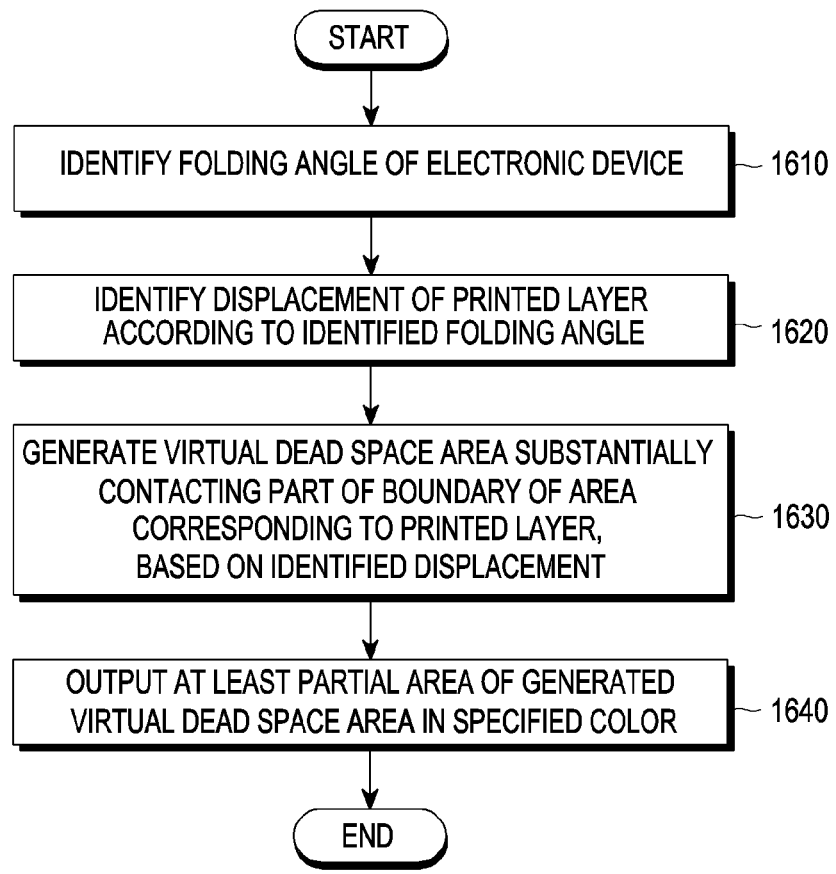
FIGS. 16 and 17 are exemplary diagrams illustrating a method of operating an electronic device according to an example embodiment.
Figure 17:
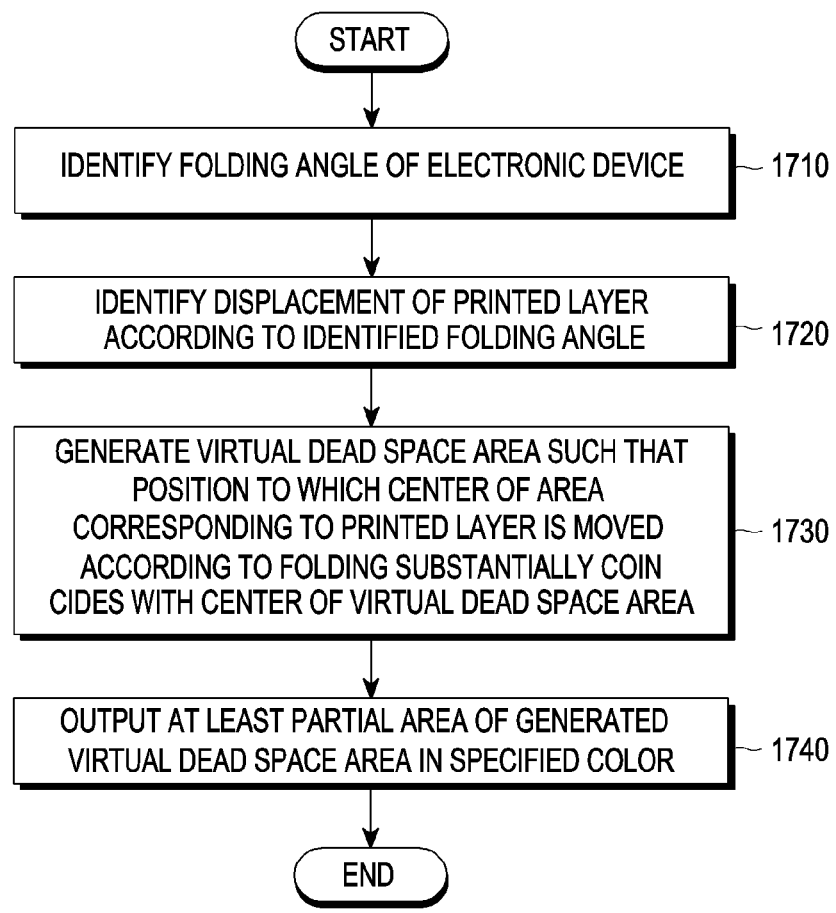

FIGS. 16 and 17 are exemplary diagrams illustrating a method of operating an electronic device according to an example embodiment. For example, a function or operation described with reference to FIG. 16 may be related to the embodiment illustrated in FIG. 14, and a function or operation described with reference to FIG. 17 may be related to the embodiment illustrated in FIG. 15.

Referring to FIG. 16, the electronic device 101 according to an example embodiment may identify a folding angle of the electronic device 101 in operation 1610. The electronic device 101 according to an example embodiment may detect an inclination angle between the housings 210 and 220 in real time by detecting the intensity of a magnetic force detected by a Hall sensor, for example. To this end, a first lookup table defining a relationship between intensities of magnetic forces (or changes in magnetic force) detected by the Hall sensor and inclination angles may be pre-stored in the electronic device 101 according to an example embodiment (e.g., in a design process of the electronic device 101). The electronic device 101 according to an example embodiment may identify the folding angle of the electronic device 101 using the first lookup table. In operation 1620, the electronic device 101 according to an example embodiment may identify a displacement of the printed layer L3' according to the identified folding angle. A second look-up table defining a relationship between folding angles and displacements of the printed layer L3' may be pre-stored in the electronic device 101 according to an example embodiment. The electronic device 101 according to an example embodiment may identify the displacement of the printed layer L3' according to the identified folding angle using the second look-up table. The electronic device 101 according to an example embodiment may generate a virtual dead space area substantially contacting a part of a boundary of an area corresponding to the printed layer L3' in operation 1630. The electronic device 101 according to an example embodiment may generate the virtual dead space area by setting, for example, the difference between the sum of the diameter of the dead space DS and the identified displacement and the difference in radius between the dead space DS and the printed layer L3' (in other words, the diameter of the dead space DS+the identified displacement–the difference between the radius of the dead space DS and the radius of the printed layer L3') as a long axis of the virtual dead space (in the case of an elliptical virtual dead space) or the diameter of the virtual dead space (in the case of a circular virtual dead space). According to an example embodiment, when the virtual dead space is elliptical in shape, a short axis of the virtual dead space may be determined to be a value between the length of the long axis of the virtual dead space and the diameter of the actual dead space DS by the electronic device 101. The electronic device 101 according to an example embodiment may determine the virtual dead space area according to the length of the long axis and the length of the short axis determined as described above. In operation 1640, the electronic device 101 according to an example embodiment may output at least a part of the virtual dead space area generated in operation 1630 in a specified color (e.g., black). The electronic device 101 according to an example embodiment may output the remaining part of the virtual dead space area except for the actual dead space DS area and the printed layer L3' in a specified color.

Referring to FIG. 17, the electronic device 101 according to an example embodiment may identify a folding angle of the electronic device 101 in operation 1710. The electronic device 101 according to an example embodiment may detect an inclination angle between the housings 210 and 220 in real time by detecting the intensity of a magnetic force detected by a Hall sensor, for example. To this end, a first lookup table defining a relationship between intensities of magnetic forces (or changes in magnetic force) detected by the Hall sensor and inclination angles may be pre-stored in the electronic device 101 according to an example embodiment (e.g., in a design process of the electronic device 101). The electronic device 101 according to an example embodiment may identify the folding angle of the electronic device 101 using the first lookup table. In operation 1720, the electronic device 101 according to an example embodiment may identify a displacement of the printed layer L3' according to the identified folding angle. A second look-up table defining a relationship between folding angles and displacements of the printed layer L3' may be pre-stored in the electronic device 101 according to an example embodiment. The electronic device 101 according to an example embodiment may identify the displacement of the printed layer L3' according to the identified folding angle using the second look-up table. The electronic device 101 according to an example embodiment may generate a virtual dead space area such that a position to which the center of an area (e.g., the printed layer L3') corresponding to a printed layer moves substantially coincides with the center of the virtual dead space area, based on the identified displacement in operation 1730. The electronic device 101 according to an example embodiment may determine the size of the virtual dead space based on the inclination angle between the housings 210 and 220 and data (e.g., the radius of the dead space DS and the displacement of the printed layer according to the inclination angle) calculated in the design process, and output the virtual dead space on a screen at a position at which the virtual dead space forms a concentric circle with the printed layer. For example, the electronic device according to an example embodiment may determine the virtual dead space VS2 such that the virtual dead space VS2 has a radius equal to the sum of the radius of the actual dead space DS and the displacement of the printed layer L3'. Accordingly, the position to which the center of the area (e.g., the printed layer L3') corresponding to the printed layer is moved by folding substantially coincides with the center of the virtual dead space area. In operation 1740, the electronic device 101 according to an example embodiment may output at least a part of the virtual dead space area generated in operation 1730 in a specified color (e.g., substantially black). The electronic device 101 according to an example embodiment may output the remaining part of the virtual dead space area except for the actual dead space DS area and the printed layer L3' in a specified color.

An electronic device according to an example embodiment may include a flexible display and at least one processor. The at least one processor may be configured to identify a folding angle of the electronic device, identify a displacement of a printed layer of the flexible display according to the identified folding angle, generate a virtual dead space area substantially contacting a part of a boundary of the printed layer of the flexible display, based on the identified displacement, and output at least a part of the generated virtual dead space area in a specified color on the flexible display.

An electronic device according to an example embodiment may include a flexible display and at least one processor. The at least one processor may be configured to identify a folding angle of the electronic device, identify a displacement of a printed layer of the flexible display according to the identified folding angle, generate a virtual dead space area based on the identified displacement, wherein a position to which a center of the printed layer is moved according to folding of the electronic device substantially coincides with a center of the virtual dead space area, and output at least a part of the generated virtual dead space area in a specified color on the flexible display.

A method of controlling an electronic device according to an example embodiment may include identifying a folding angle of the electronic device, identifying a displacement of a printed layer of the flexible display according to the identified folding angle, generating a virtual dead space area substantially contacting a part of a boundary of the printed layer of the flexible display, based on the identified displacement, and outputting at least a part of the generated virtual dead space area in a specified color on the flexible display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element(s).

As used in the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a flexible display, and
at least one processor,
wherein the at least one processor is configured to:
identify a folding angle of the electronic device,
identify a displacement of a printed layer of the flexible display based on the identified folding angle,
generate a virtual dead space area substantially contacting a part of a boundary of the printed layer of the flexible display, based on the identified displacement, and
control to output at least a part of the generated virtual dead space area in a specified color on the flexible display.

2. The electronic device of claim 1, further comprising a sensor module, comprising at least one sensor, configured to identify the folding angle.

3. The electronic device of claim 1, wherein the at least one processor is configured so that an area on the flexible display corresponding to the printed layer of the flexible display is to be represented in a color substantially the same as the specified color.

4. The electronic device of claim 1, wherein the virtual dead space area substantially contacts a part of a boundary of an actual dead space area, while substantially contacting the part of the boundary of the printed layer of the flexible display.

5. The electronic device of claim 4, wherein the at least one processor is further configured to determine a long axis of the virtual dead space area at least by calculating a difference between a sum of a diameter of the actual dead space area and the identified displacement and a difference between a radius of the actual dead space area and a radius of the printed layer of the flexible display.

6. The electronic device of claim 5, wherein the at least one processor is further configured to determine a short axis of the virtual dead space as a value between a length of the determined long axis of the virtual dead space and the diameter of the actual dead space.

7. The electronic device of claim 1, wherein the at least one processor is further configured to control to output a remaining part except for an actual dead space area and the printed layer of the flexible display in the specified color.

8. The electronic device of claim 1, wherein the at least one processor is further configured to identify the displacement of the printed layer of the flexible display based on the identified folding angle, using at least a lookup table pre-stored in a memory of the electronic device.

9. A method of controlling an electronic device including a flexible display, comprising:
identifying a folding angle of the electronic device,
identifying a displacement of a printed layer of the flexible display based on the identified folding angle,
generating a virtual dead space area substantially contacting at least a part of a boundary of the printed layer of the flexible display, based on the identified displacement, and
outputting at least a part of the generated virtual dead space area in a specified color on the flexible display.

10. The method of claim 9, further comprising representing an area on the flexible display corresponding to the printed layer of the flexible display in a color substantially the same as the specified color.

11. The method of claim 9, wherein the virtual dead space area substantially contacts a part of a boundary of an actual dead space area, while substantially contacting the part of the boundary of the printed layer of the flexible display.

12. The method of claim 11, further comprising determining a long axis of the virtual dead space area at least by calculating a difference between a sum of a diameter of the actual dead space area and the identified displacement and a difference between a radius of the actual dead space area and a radius of the printed layer of the flexible display.

13. The method of claim 12, further comprising determining a short axis of the virtual dead space as a value between a length of the determined long axis of the virtual dead space and the diameter of the actual dead space.

14. The method of claim 9, further comprising outputting a remaining part except for an actual dead space area and the printed layer of the flexible display in the specified color.

15. The method of claim 9, further comprising identifying the displacement of the printed layer of the flexible display based on the identified folding angle, using at least a lookup table pre-stored in the electronic device.

* * * * *